(12) United States Patent
Gothait

(10) Patent No.: US 6,658,314 B1
(45) Date of Patent: Dec. 2, 2003

(54) SYSTEM AND METHOD FOR THREE DIMENSIONAL MODEL PRINTING

(75) Inventor: Hanan Gothait, Rehovot (IL)

(73) Assignee: Objet Geometries Ltd., Rehovot (IL)

( * ) Notice: Subject to any disclaimer, the term of this patent is extended or adjusted under 35 U.S.C. 154(b) by 0 days.

(21) Appl. No.: 09/412,618

(22) Filed: Oct. 6, 1999

(51) Int. Cl.$^7$ .............................................. G06F 19/00
(52) U.S. Cl. ........................ 700/119; 700/98; 264/409
(58) Field of Search ........................ 700/98, 120, 163, 700/118, 119, 182, 103, 29; 156/158; 425/379.1; 264/401, 109, 106, 112

(56) References Cited

U.S. PATENT DOCUMENTS

| | | | |
|---|---|---|---|
| 4,575,330 A | * 3/1986 | Hull | 425/174.4 |
| 5,136,515 A | 8/1992 | Helinski | 264/221 |
| 5,149,548 A | * 9/1992 | Yamane et al. | 425/174 |
| 5,182,056 A | * 1/1993 | Spence et al. | 264/401 |
| 5,204,055 A | * 4/1993 | Sachs et al. | 419/2 |
| 5,287,435 A | 2/1994 | Cohen et al. | 345/418 |
| 5,340,433 A | * 8/1994 | Crump | 156/578 |
| 5,340,656 A | * 8/1994 | Sachs et al. | 428/546 |
| 5,387,380 A | 2/1995 | Cima et al. | 264/96 |
| 5,519,816 A | * 5/1996 | Pomerantz et al. | 395/119 |
| 5,594,652 A | * 1/1997 | Penn et al. | 364/468.26 |
| 5,637,169 A | * 6/1997 | Hull et al. | 156/155 |
| 5,717,599 A | 2/1998 | Menhennett et al. | 264/401 |
| 5,740,051 A | * 4/1998 | Sanders, Jr. et al. | 364/468.26 |
| 5,784,279 A | 7/1998 | Barlage, III et al. | 700/119 |
| 5,807,437 A | 9/1998 | Sachs et al. | |
| 5,851,465 A | * 12/1998 | Bredt | 264/109 |
| 5,879,489 A | * 3/1999 | Burns et al. | 156/64 |
| 5,902,537 A | * 5/1999 | Almquist et al. | 264/401 |
| 5,943,235 A | 8/1999 | Earl et al. | 700/119 |
| 5,965,079 A | * 10/1999 | Manners | 264/308 |
| 6,030,199 A | * 2/2000 | Tseng | 425/132 |
| 9,133,355 | * 10/2000 | Leyden et al. | 524/277 |
| 6,165,406 A | * 12/2000 | Jang et al. | 264/308 |
| 6,259,962 B1 | 7/2001 | Gothait | |

FOREIGN PATENT DOCUMENTS

WO    WO 97/31781    9/1997

OTHER PUBLICATIONS

*Three Dimensional Printing: What is 3DP?*, (3 Pages) ® 1989–1999.

Z Corporation, News Release, "Z Corp. Debuts Robust New Materials System", Apr. 2, 1998.

* cited by examiner

Primary Examiner—Leo Picard
Assistant Examiner—Kidest Bahta
(74) Attorney, Agent, or Firm—Eitan, Pearl, Latzer & Cohen Zedek, LLP

(57) ABSTRACT

A method and a system for three-dimensional printing of a three-dimensional model is provided. The method includes dispensing a first interface material from a printing head, dispensing at least a second interface material from the printing head and combining the first and second interface material in pre-determined proportions to produce layers for forming the three-dimensional model. In one embodiment, the layers forming the construction layers of the model are formed from interface material having a harder modulus of elasticity from the layers forming the release layers, thereby allowing for the forming complex three-dimensional shapes.

43 Claims, 8 Drawing Sheets

SYSTEM AND METHOD FOR THREE DIMENSIONAL MODEL PRINTING

FIELD OF THE INVENTION

This present invention relates to three-dimensional (3-D) modeling in general and to a system and a method for 3-D printing of complex structures in particular.

BACKGROUND OF THE INVENTION

3-D printing, which works by building parts in layers, is a process used for the building up of 3-D models. 3-D printing is relatively speedy and flexible allowing for the production of prototype parts and tooling directly from a CAD model, for example.

Using 3-D printing enables the manufacturer to obtain a full 3-D model of any proposed product before tooling thereby possibly substantially reducing the cost of tooling and loading to a better synchronization between design and manufacturing. A lower product cost and improved product quality can also be obtained.

Various systems have been developed for computerized 3-D printing. Known systems include a system developed by 3-D Systems Inc. of California, USA, which operates on the basis of stereo-lithography wherein a focused ultra-violet laser is scanned over the top of a bath of photopolymerizable liquid polymer plastic material. The surface of the bath is polymerized on contact with the UV laser creating a solid plastic layer at or just below the surface U.S. Pat. No. 5,387,380 to Cima et al. describes a technique for providing layered parts by depositing a layer of powder material and then depositing a binder material in selected regions to produce a layer of bonded powder material at the selected regions. These steps are repeated for successive layers to form a desired component. Following heat treatment, unbound powder is removed, leaving the fabricated part.

U.S. Pat. No. 5,287,435 to Cohen et al describes apparatus for producing 3-D models which includes apparatus for depositing layer-by-layer, a photopolymer material in a selectable configuration and apparatus for curing each layer prior to deposition of the succeeding layer.

A disadvantage of these systems is the difficulty of printing 3-D models having a complex structure such as a tea cup, for example (shown in FIG. 2).

In U.S. patent application Ser. No. 09/259,323 to the Assignees of the present application, and incorporated herein by reference, there is described an apparatus and a method for 3-D model printing. U.S. patent application Ser. No. 09/259,323 describes apparatus including a printing head having a plurality of nozzles, a dispenser connected to the printing head for selectively dispensing interface material in layers and curing means for optionally curing each of the layers deposited. The depth of each deposited layer is controllable by selectively adjusting the output from each of the plurality of nozzles.

SUMMARY OF THE INVENTION

The present invention provides a 3-D printing system and a method for printing complex 3-D models by utilizing at least two printing heads which eject interface material. By using interface material having different hardness (or modulus of elasticity) and mixing the interface material from each of the printing heads, the hardness of the layers of material forming the 3-D model can be controlled. The layers forming the construction layers of the model are formed from interface material having a different (harder) modulus of elasticity from the layers forming the release layers, thereby allowing for the forming complex shapes.

There is thus provided, in accordance with a preferred embodiment of the present invention, a method for three-dimensional printing of a three-dimensional model. The method includes:

dispensing a first interface material from a printing head;

dispensing at least a second interface material from the printing head; and combining the first and second interface material in pre determined proportions to produce construction layers for forming the three-dimensional model.

Furthermore, in accordance with a preferred embodiment of the present invention, the printing head includes first and second printing heads. The first interface material and second interface material are dispensed from the first and second printing heads, respectively.

Furthermore, in accordance with a preferred embodiment of the present invention, the method further includes the step of curing the first interface material for a first period of time and at a first radiation wavelength to obtain a first modulus of elasticity. The method further includes the step of curing the second interface material for a second period of time and at a second radiation wavelength to obtain a second modulus of elasticity.

Furthermore, in accordance with a preferred embodiment of the present invention, the step of combining includes the step of adjusting the relative proportions of the first and second interface materials, the first and second interface materials having different modulus of elasticity.

Furthermore, in accordance with a preferred embodiment of the present invention, the further includes the step of combining the first and second interface material in pre-determined proportions to form a release layer, the release layer having a lower modulus of elasticity than the construction layer. The release layer includes a plurality of release blocks, each of the release blocks having a pre-determined modulus of elasticity.

Furthermore, in accordance with a preferred embodiment of the present invention, 95 to 100% of the construction layer includes the first interface material and 0 to 5% of the construction layer includes the second interface material. 0 to 5% of the release layer includes the first interface material and 95 to 100% of the release layer includes the second interface material.

Additionally, in accordance with a preferred embodiment of the present invention, the first interface material is a different color than the second interface material. Furthermore, the first and/or second interface material is transparent.

There is additionally provided, in accordance with a preferred embodiment of the present invention, a system for three-dimensional printing of a three-dimensional model, which includes at least one printing head, having a plurality of nozzles, at least first and second dispensers connected to the printing head for dispensing at least first and second interface materials therefrom respectively, and control means connected to the printing head for combining at the first and second interface materials in pre-determined proportions to produce forming the three-dimensional model.

Furthermore, in accordance with a preferred embodiment of the present invention, the system further includes curing means for optionally curing the layers. The curing means includes a first curing means for curing the first interface material for a first period of time and at a first radiation wavelength to obtain a first modulus of elasticity; and a second curing means for curing the second interface material for a second period of time and at a second radiation wavelength to obtain a second modulus of elasticity.

The printing head includes first and second printing heads wherein the first interface material and second interface material are dispensed from the first and second printing heads, respectively.

Furthermore, in accordance with a preferred embodiment of the present invention, the layers comprise first construction layers and second release layers. The first construction layers and the second release layers have differing proportions of the first and the second interface materials, respectively, and different moduluses of elasticity.

Furthermore, in accordance with a preferred embodiment of the present invention, the system further includes positioning apparatus coupled to the control means for selectively positioning the first and second printing heads by commands from the control means.

In addition, there is provided, in accordance with a preferred embodiment of the present invention, a system for three-dimensional four-color printing of a three-dimensional model, which includes at least one printing head, having a plurality of nozzles, a plurality of dispensers connected to the at least one printing head for dispensing a plurality of interface materials and control means connected to the at least one printing head for combining the plurality of interface materials in pre-determined proportions to produce layers having different colors for forming the three-dimensional model.

Furthermore, in accordance with a preferred embodiment of the present invention, the printing head includes a plurality of printing heads and wherein each of the plurality of interface materials are dispensed from a different one of each of the plurality of printing heads, respectively.

Furthermore, in accordance with a preferred embodiment of the present invention, the system further includes curing means for optionally curing the layers. The curing means includes at least first curing means for curing at least one of the plurality of interface materials for a first period of time and at a first radiation wavelength to obtain a first modulus of elasticity. The system further includes a dispenser for dispensing transparent material.

Furthermore, in accordance with a preferred embodiment of the present invention, the layers have different moduluses of elasticity. The layers are a photopolymer material curable by the application of any one of a group including ultra violet radiation, infra red radiation and E-beam.

BRIEF DESCRIPTION OF THE DRAWINGS

The present invention will be understood and appreciated more fully from the following detailed description taken in conjunction with the appended drawings in which.

LIST OF DEFINITIONS

The following definitions are used in this Application:

block—any size or shape of interface material deposited by at least one nozzle of a printing head;

pass a plurality of blocks deposited in a single pass of a printing head;

layer—a plurality of passes by a printing head model layer (or component) a layer of interface material constituting the 3-D model;

support layer (or component)—a layer of interface material for supporting the 3-D model layer and not constituting the 3-D model;

release layer (or component)—a layer of interface material for separating the 3-D model layer from components, such as the support layer, not constituting the 3-D model.

The terms hardness and softness are used as relative terms to indicate the differences in modulus of elasticity between interface materials. The hardness of a material may be described by reference to its modulus of elasticity, which may be defined as: "The ratio of stress to its corresponding strain under given conditions of load, for materials that deform elastically, according to Hooke's law".

DETAILED DESCRIPTION OF THE PRESENT INVENTION

Figure 1:
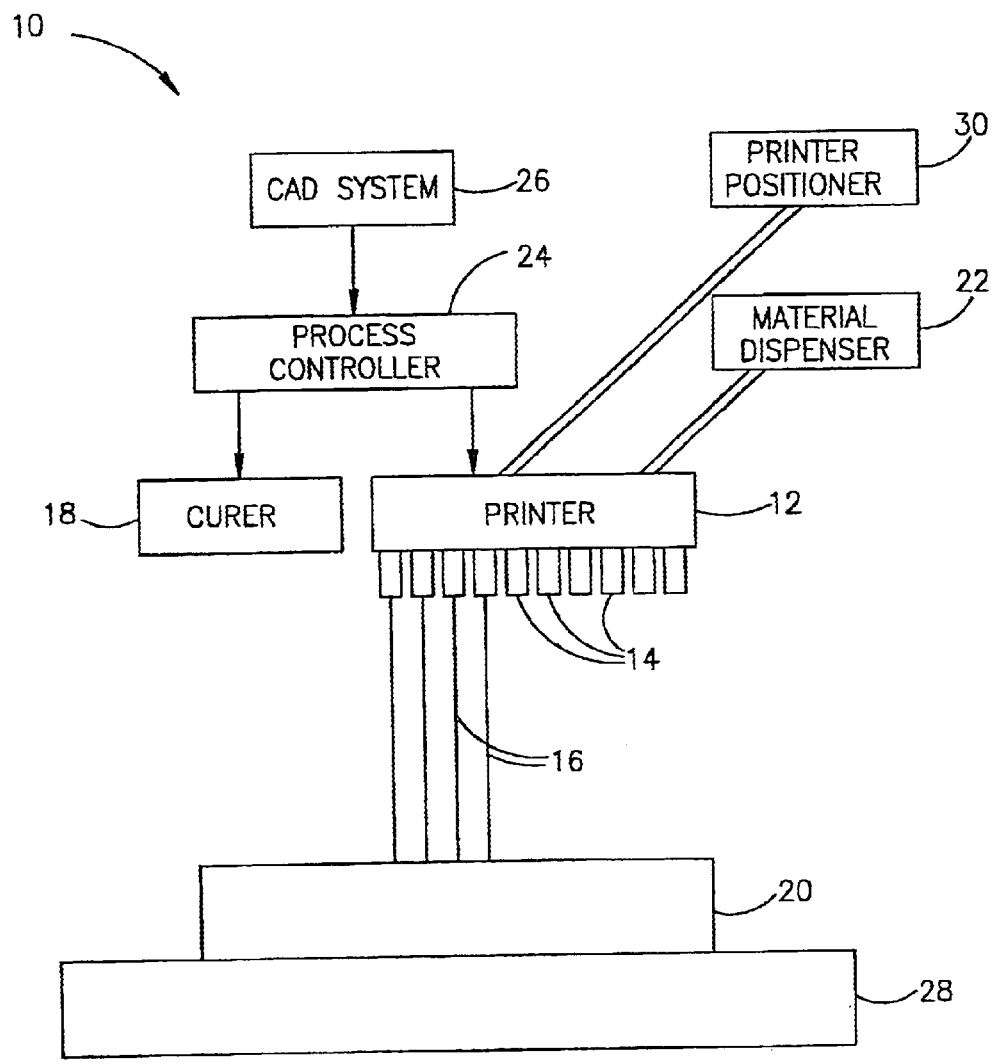
FIG. 1 is a schematic illustration of an embodiment of a 3-D printing system, described in U.S. patent application Ser. No. 09/259,323, assigned to the Assignees of the present application.

Reference is made to FIG. 1, which is a schematic illustration of the 3-D printing system, generally designated 10, described in U.S. patent application Ser. No. 09/259,323, assigned to the Assignees of the present application and incorporated herein by reference.

The 3-D printing system 10 includes a printing head 12 having a plurality of ink-jet nozzles 14, through which interface material 16 is jetted and a curing unit 18 for curing the interface material 16 to form the 3-D component, referenced 20, being designed. The interface material 16 is preferably a photopolymer, containing ultra violet (UV) or infra red (IR) curable material. For example, material based on reactive acrylates is suitable for UV curing or hardening by the application of UV radiation from curing unit 18. The 3-D component 20 is build up in layers, the depth of each layer being controllable by selectively adjusting the output from each of the plurality of ink-jet nozzles 14.

The 3-D printing system 10 further includes a dispenser 22, a process controller 24 and a Computer Aided Design (CAD) system 26. The process controller 24 is coupled to CAD system 26, curing unit 18 and printing head 12.

The dispenser 22, which contains interface material 16, is suitably connected to printing head 12. The 3-D component 20 is formed on a support surface 28, which can be optionally positioned in the Z- and Y-axes by positioning apparatus 30.

Figure 2:
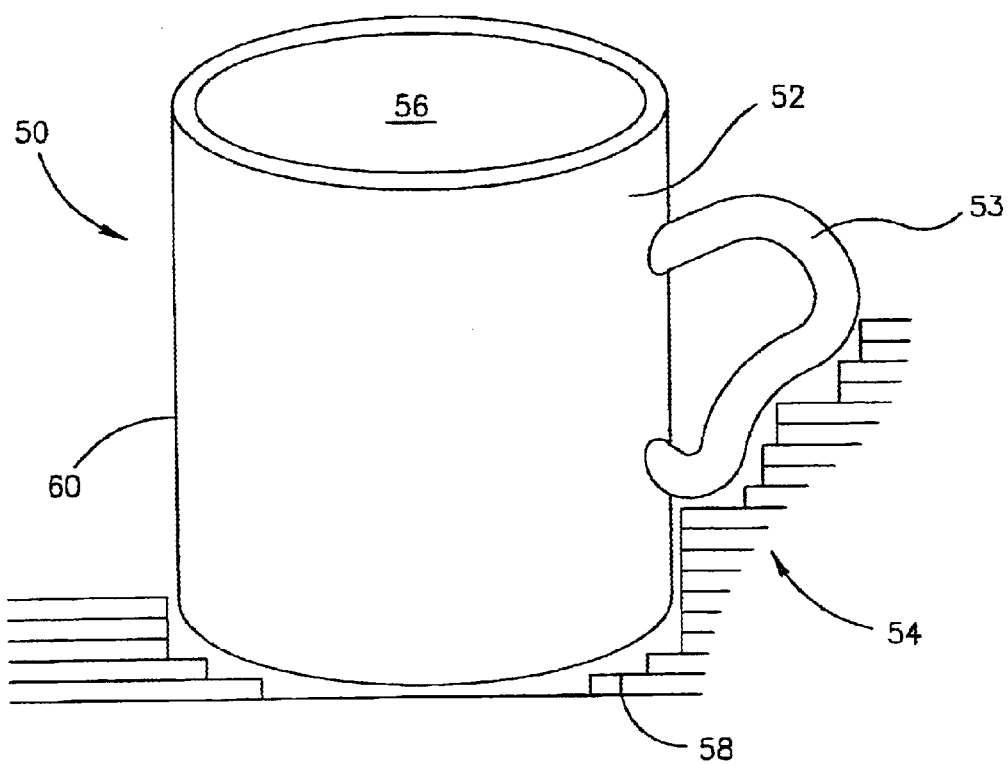
FIG. 2 is an elevational view of an 3-D object printable by the printing system of FIG. 3.

Reference is now made to FIG. 2 which is an elevational view of a tea cup, generally referenced 50. In order to print this 3-D model using ink-jet type printing heads of FIG. 1, two problems need to be overcome. Firstly, since the printing head 12 prints or deposits interface material in horizontal layers, the model layers 52 of the tea cup 50 need to be supported externally, such as under the handle 52 (indicated by the stepped support 54), and secondly, an internal void, referenced 56, needs to be formed during printing.

Figure 3:
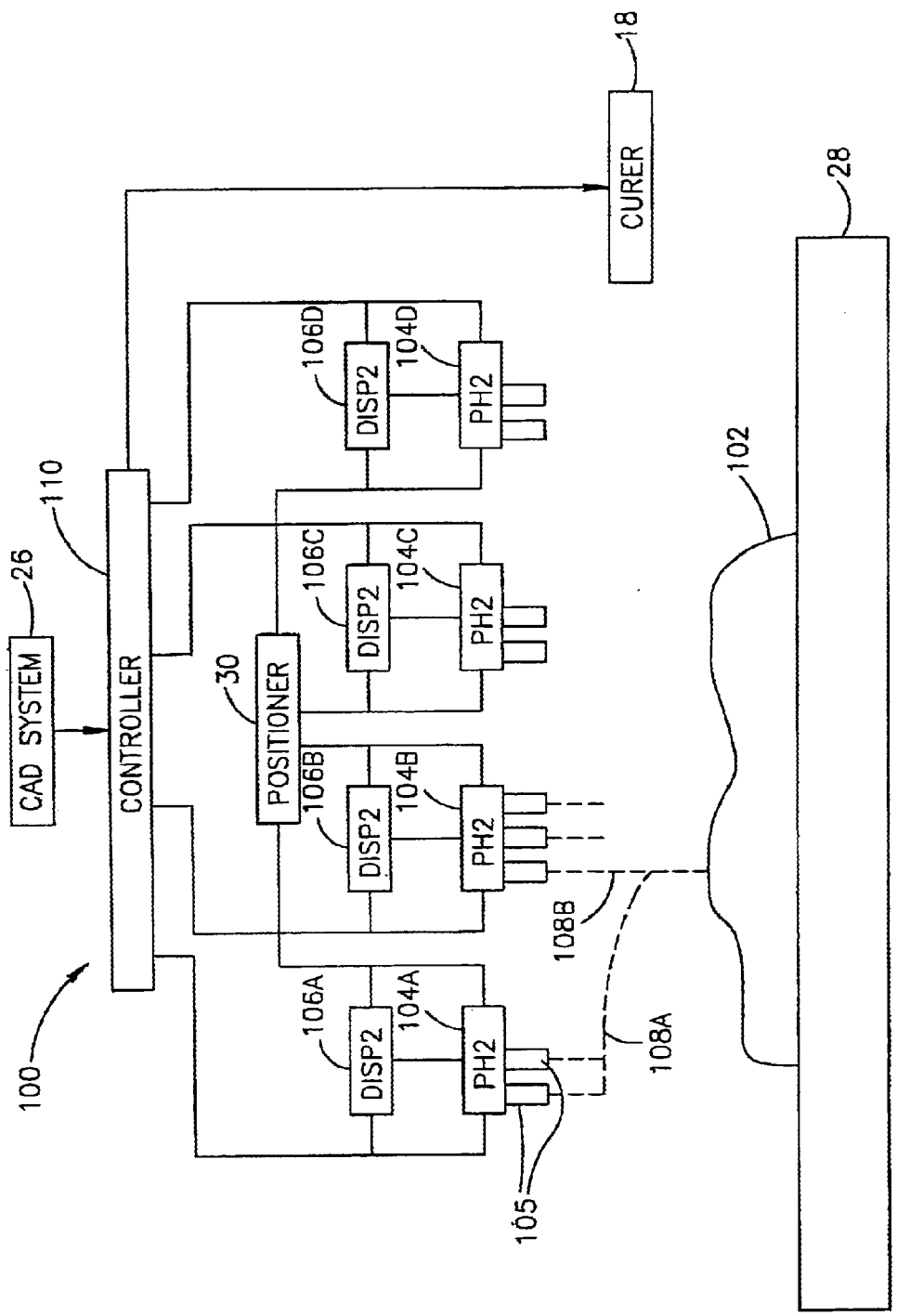
FIG. 3 is a schematic illustration of a 3-D printing system, constructed and operative in accordance with a preferred embodiment of the present invention.

Reference is now also made to FIG. 3, which is a schematic illustration of a 3-D printing system generally designated 100, constructed and operative in accordance with a preferred embodiment of the present invention, for forming the 3-D component, referenced 102, being designed. FIG. 3 is similar to FIG. 1 and utilizes similar components. These components have been similarly designated and will not be described further.

The 3-D printing system 100 includes a plurality of printing heads, generally referenced 104 and individually referenced 104a, 104b, etc., connected to corresponding interface material dispensers 106a, 106b, etc. containing interface material, correspondingly referenced 108a, 108b, etc.

The printing heads 104 each preferably have a plurality of ink-jet type nozzles 105, through which interface material 108a, 108b is jetted. The interface material 108a, 108b is preferably a photopolymer, containing ultra violet (UV) curable material suitable for UV curing or hardening by the application of UV radiation from curing unit 18. The 3-D printing system 100 further includes a dispenser 106a, 106b, a controller 110 and a Computer Aided Design (CAD) system 26 and optionally positioning apparatus 30. The controller 110 is coupled to CAD system 26, curing unit 18, positioning apparatus 30, each of the printing heads 104, and dispensers (106a–106d).

The Applicants have realized that by combining or mixing material from at least two printing heads, wherein each printing head dispenses interface material having a different hardness, it is possible to adjust and control the hardness of the material forming the 3-D object being produced. Thus, by controlled mixing of the interface material being output from each of the printing heads, different parts of the 3-D object 102 having different modulus of elasticity can be produced utilizing these printing heads.

Thus, in the example of the tea cup 50 (FIG. 2), the support layers 54 may be constituted from mix proportions similar to (or alternatively different from) the constructed model layer 52, such as the handle 53, since the support layer 54 is separated from the model layer 52 by a release layer, referenced 58, which is generally softer than the model layer 52.

The release layer 58, between the support layer 54 and model layer 52 can be constituted by mixing the proportions of the interface materials so that the mix for the release layer 58 is softer than the constructed model layer 52. Thus, the support layer can be easily separated from the 3-D model to leave the desired completed product. Similarly, the internal void 56 can be formed from a softer mix than the cup wall 60.

The terms hardness and softness are used as relative terms to indicate the differences in modulus of elasticity between the interface materials 108a and 108b in the respective interface material dispensers 106a and 106b.

Modulus of elasticity may be measured in mega Pascal units. For the purposes of example only and without any limiting the present application, the interface material 108a preferably has a modulus of elasticity of 1000 mega Pascal while softer interface material 108b preferably has a modulus of elasticity of less than 1 meg Pascal. As described in the aforementioned U.S. patent application Ser. No. 09/259, 323, the 3-D model is build up in layers. The 3-D model tea cup 50 can be formed in layers, utilizing two printing heads, as will now be described with reference to FIG. 4 which is an enlarged detail of part of the tea cup 50 of FIG. 2.

Tea cup 50 includes a base 62 as well as the generally cylindrical wall 60. The construction of the cup 50 is schematically illustrated by several layers, referenced L1, L2, . . . L9, etc. The support layers 54 are referenced L1s, L2s, etc., the release component 58 of the layer are referenced L1r, L2r, etc and the model layers are L1m, L2m, etc. The layers shown are not to scale and it will be appreciated that since a single jetted deposited layer is approximately 10μ, the thickness of the layers shown (L1, L2 etc) may consist of several deposited layers and be formed from several passes of the printing heads 104.

Figure 5:
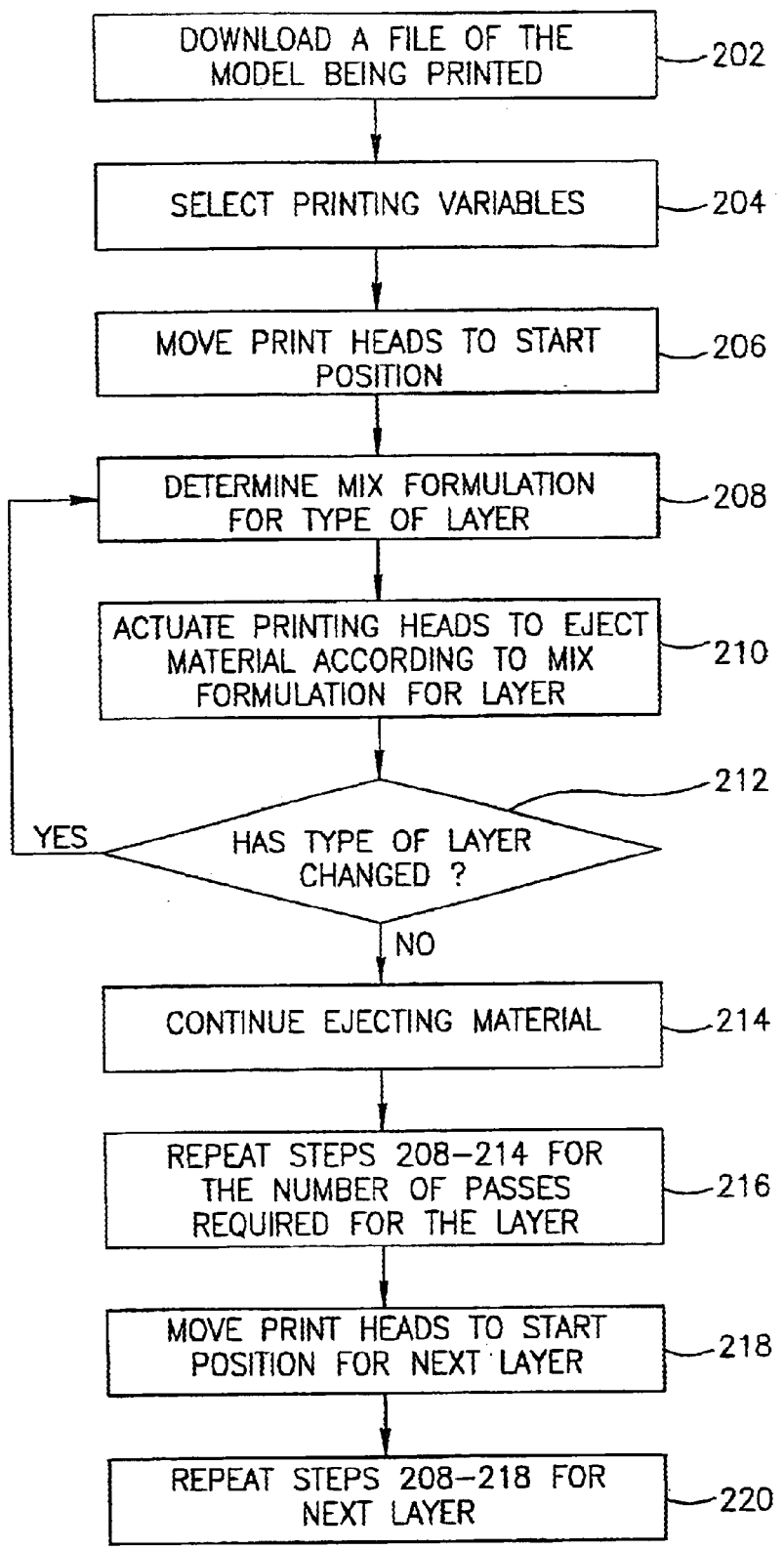
FIG. 5 is flow chart illustrating the build-up of the 3-D object of FIG. 2.

Reference is now also made to FIG. 5 which is flow chart illustrating the build-up of the 3-D object 102 using two printing heads 104, each of which preferably have a plurality of nozzles 105. A file of the model to be produced is downloaded to the CAD system 26 (step 202) allowing the operator to view the model and control the operational procedure.

The operator selects those variables (step 204) which define the finished product. These variables include the desired resolution of the jet head, the desired spacing between consecutive ink-dot lines and the number (h) of layers to be used in building up the model. The number of steps (l) through which the printing heads 104 are displaced (in the x-y axes) to print a single layer and the number of vertical steps (i), in the z-axis, to print the model are calculated. These steps are described in U.S. patent application Ser. No. 09/259,323.

The printing heads 104a, 104b are positioned at the start position (axis line 64) for the first layer L1 (step 206) and the mix formulation for the type of layer at this position determined (step 208).

Figure 4:
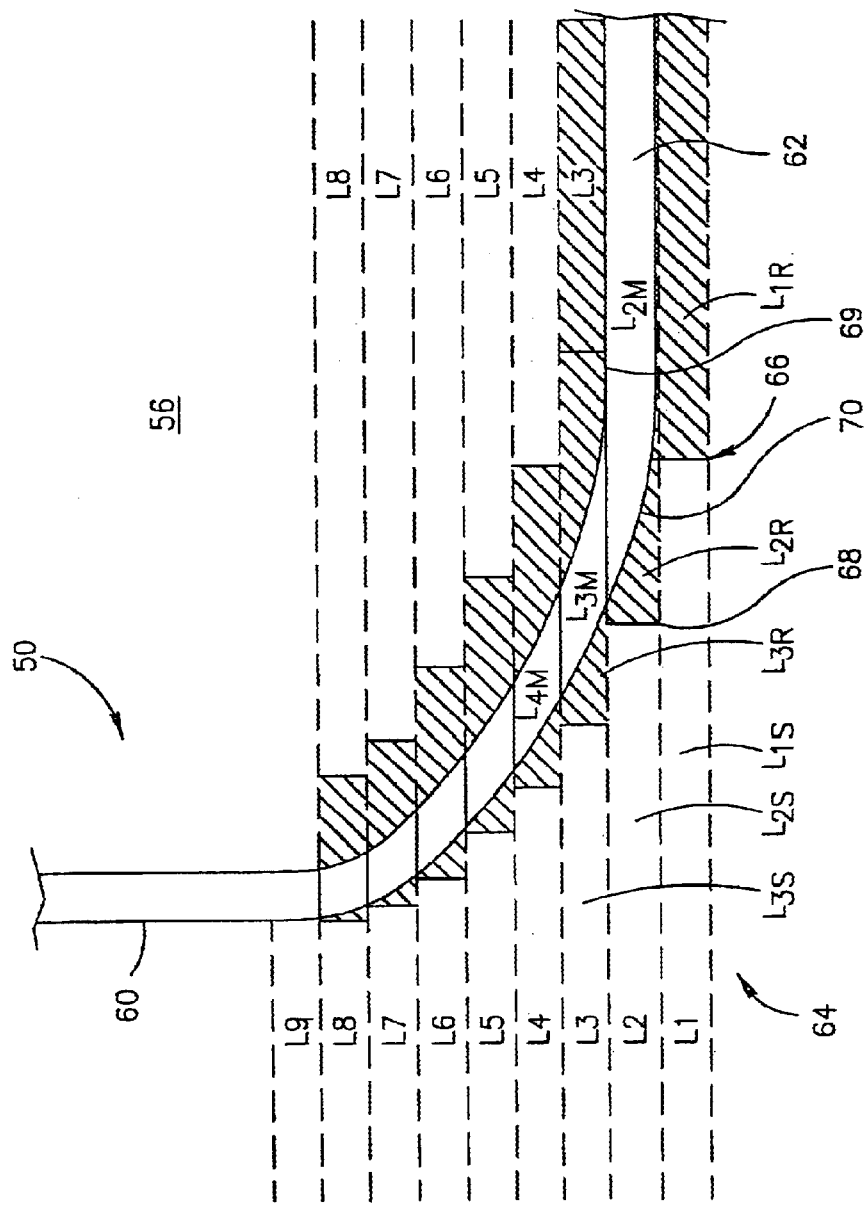
FIG. 4 is an enlarged detail of the 3-D object of FIG. 2.

In the example of FIG. 4, position 64 is a support layer (L1s) and thus, the mix is formulated so as to be of sufficient consistency for supporting the plurality of layers (L2, L3, etc) above it. For example, the support layers (L1s, L2s, etc.) may be constituted in the proportion of 80% of interface material 108a and 20% of interface material 108b. In this example, the model layers, such as base 62 and walls 64, may be constituted in the proportion of 90–100% of interface material 108a and up to 10% of interface material 108b. The release layers generally consist of a higher proportion of softer interface material 108b and may be constituted, for example, in the proportion of 5% of interface material 108a and 95% of interface material 108b.

The support layer L1s is formed by simultaneously ejecting interface material from both printing heads 104a and 104b in the determined proportions (step 210). As the printing heads move from left to right, the support layer changes to a release layer (arrow 66). The mix formulation is changed to that required for the release layer (L1r)— (query box 212) and the softer release layer is deposited (repeating steps 208–212). If the type of layer is the same, the same mix is deposited (step 214).

Steps 208–214 may be repeated several times so that the single layer (L1) is build up from several passes of the printing heads 104a, 104b (step 216).

After completing the layer (L1), the printing heads 104a, 104b are moved back to the start position for the next layer (L2) and repositioned in the vertical-axis (64) above the first layer (step 218). Since the thickness of a layer is approximately 10μ, it is not essential to reposition the printing head relative to the model after every pass, and this step may be deferred at the discretion of the operator.

The mix formulation for this position is determined (repeat step 208). In this case, since it is a support layer, the mix is the same as in layer L1. However, it will be appreciated that the mix formulation may vary from support layer to support layer and need not be the same each time.

The support layer L2s is formed by simultaneously ejecting interface material from both printing heads 104a and 104b in the determined proportions (similar to step 210). As the printing heads move from left to right, the support layer changes to a release layer (arrow 68). The mix formulation is changed to that required for the release layer (L2r)—(similar to step 208) and the softer release layer is deposited (similar to step 210). As the printing heads move from left to right, the release layer changes to the model layer (along curve 70). The mix formulation is changed to that required for the model layer (L2m) and the model layer is deposited as previously described with respect to the lower layers.

Since the change from support (L2s) to release layer (L2r) to model layer (L2m) does not occur at the identical point on the vertical axis along the whole horizontal length of this layer (L2) in contrast to layer L1, the repetition of steps 208–218 are not exactly identical for each of the passes making up the layer. In practice since each pass is approximately 10μ, the change from one type of mix to another is a smooth transition during each pass.

After completing the layer (L2), the printing heads 104a, 104b are moved back to the start position for the next layer (L3) and repositioned in the vertical-axis (64) above the first layer (repeat step 218).

The deposition of layer L3 is similar to that described for layer L2 with the following difference: As the printing heads 104a, 104b continue their pass, there is an additional transition, from model layer (L3m) to release layer (L3r). In this case, after the model layer L3m has been deposited, the mix formulation is changed to that required for the release layer (L2r) (repeat step 208) and sufficient of the release layer (69) is deposited (repeat step 210) adjacent to the model layer (L3m) so as to provide a break between the model layer and the release layer.

After the release layer 69 has been deposited, there is a further transition, from release layer (L3r) to a support layer (L3s). The modulus of elasticity of this support layer (L3s) my be similar to the modulus of elasticity of the previously laid support layer or of any other layer, such as the model (L3m) layer, which is harder than the release layer (L3r).

Curing is preferably carried out after the deposition of each layer. However, alternatively, curing may be optionally deferred so that curing occurs after the deposition of more than one layer.

Figure 6A:
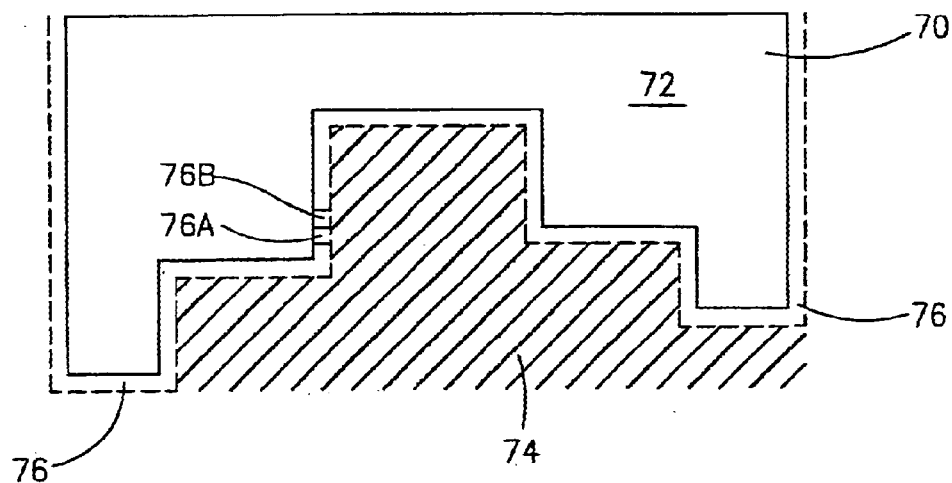
FIGS. 6A, 6B, 6C and 6D are schematic elevational illustrations of examples of 3-D objects constructed by the 3-D printing system of FIG. 3.
Figure 6B:
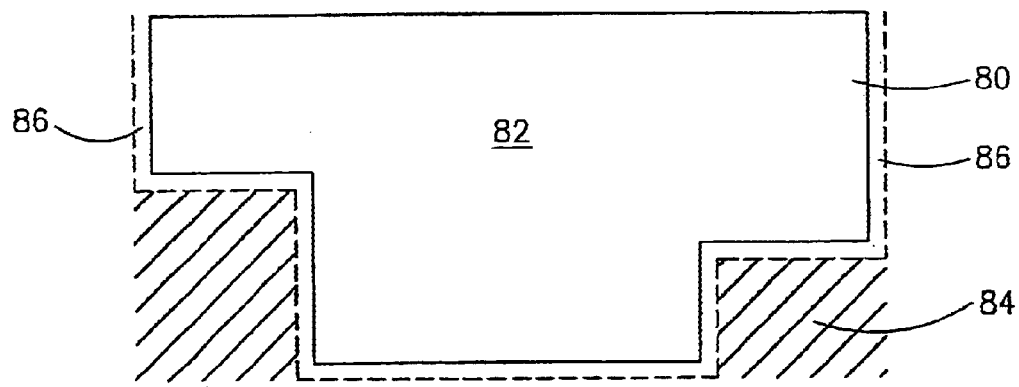

Reference is now made to FIGS. 6A–6D, which are schematic elevational illustrations of examples of 3-D models which illustrate the operation of the invention. FIGS. 6A and 6B illustrate generally non-complex shapes. FIG. 6A is a sectional elevation of a 3-D model part 70 having model layers 72, support layers 74 (shown hatched) and release layers 76 (delimited by dashed lines). FIG. 6A has a generally rectangular cross-section similar to a 'mortise' with a 'tenon'-like component removed.

FIG. 6B is a sectional elevation of a 3-D model part 80 having model layers 82, support layers 84 (shown hatched) and release layers 86 (delimited by dashed lines). FIG. 6B is a has a generally "[" cross-section. In both FIGS. 6A and 6B, the release layers 76 and 86, respectively, can be easily detached form the model and thus they may be formed of the interface material having the same hardness or modulus of elasticity. Alternatively, adjacent release blocks, such as those referenced 76a and 76b, may be constituted from materials having different modulus of elasticity, so that these release blocks may be separated from each other. This is particularly important for complex shapes such as those shown in FIGS. 6C and 6D, to which is now made.

In a further embodiment of the present application, the release layer for complex shapes includes a plurality of passes, each pass comprising a plurality of 'release blocks', wherein each of the release blocks contains interface material of a different specific modulus of elasticity (or hardness).

Figure 6C:
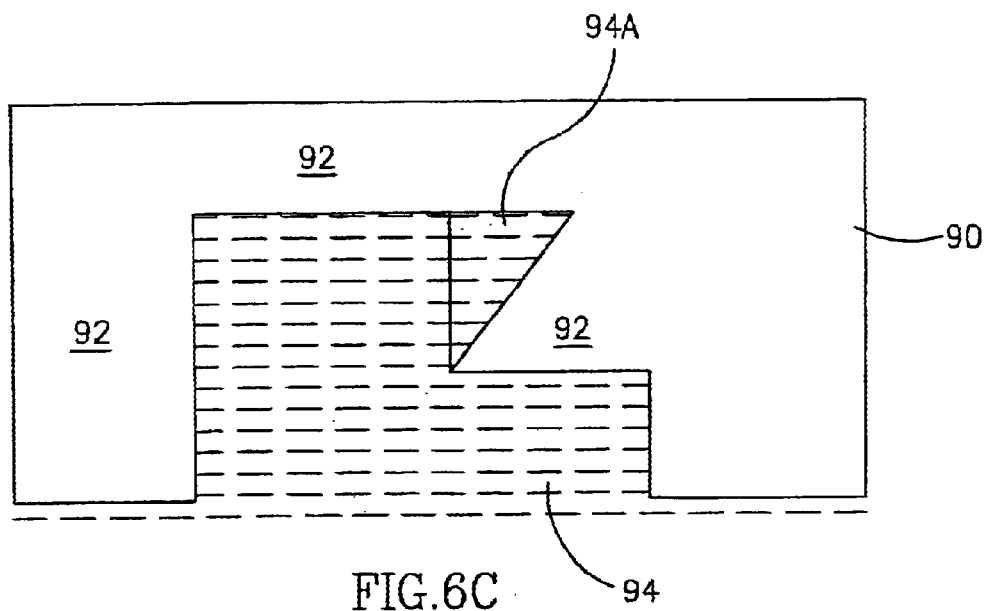
Figure 6D:
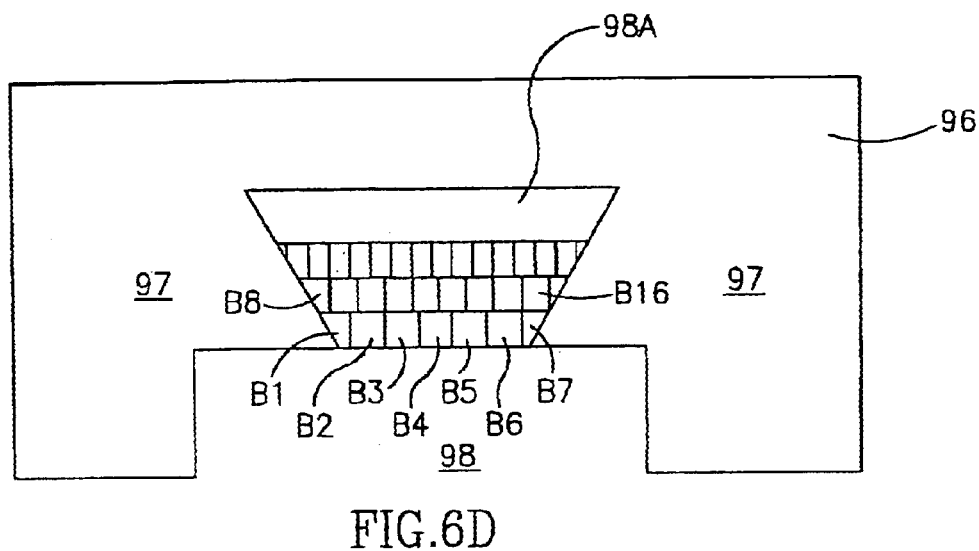

FIG. 6C is a sectional elevation of a 3-D model part 90 having model layers 92, and release layers 94 (shown by dashed lines). FIG. 6D is a sectional elevation of a 3-D model part 96 having model layers 97, and release layers 98.

In contrast to the shapes of FIGS. 6A and 6B, the release layer 94 of FIG. 6C is not easily detached from the model 92 because of the triangular element, referenced 94a. Similarly, the release layer 98 of FIG. 6D is not easily detached from the model 96 because of the double triangular element, referenced 98a.

In order to separate the release layers formed within complex shapes, the release layers are formed from a plurality of 'release blocks'. Thus, in the example of FIG. 6D, release layers 98a is constituted from a plurality of adjacent blocks, referenced B1, B2, B3, etc. Each of the release blocks contains interface material of a specific modulus of elasticity (different hardness). Thus, the release layer defined by the row comprising blocks B1–B6 is constituted from blocks which because adjacent blocks have material of different hardness allow the row to more easily be detached and thus released from the model. Consequently, once this row (B1–B7) has been detached, the row above it comprising blocks B7–B16 can similarly be detached.

It will be appreciated by persons knowledgeable in the art that the release blocks are not limited to any size or shape and that a release block may itself be constituted form a plurality of smaller "sub-blocks" of different size and shape.

Figure 6E:
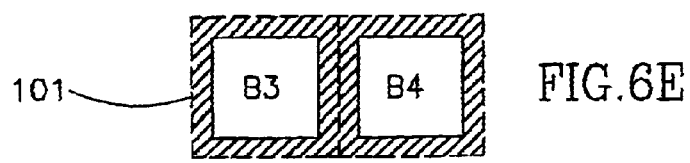
FIG. 6E is an enlarged detail of adjacent 'release blocks'.

In an alternative embodiment, which is illustrated by reference to FIG. 6E, which is an enlarged detail of adjacent 'release blocks', a "skin release" layer 101 is formed between adjacent 'release blocks', thereby facilitating the release of adjacent blocks B3/B4. The "skin release" layer may be formed by depositing interface material of a lower elasticity than the release layer itself, while moving the printing head slightly sideways, that is by a width less than the width of the 'release block'. For example, for a release block having a width of say 50 microns, a "skin release" layer of approximately 10 microns can be formed. This "skin release" layer may be applied to any geometric block shape.

It will be appreciated that the use of blocks is not restricted to release blocks but support and model layers may also be constituted from a plurality of blocks.

It will be appreciated that the use of two or more print heads is not limited to dispensing interface material having different modulus of elasticity or hardnesses but that the print heads may also contain interface material having different colors and/or different transparencies.

Thus, in a further embodiment of the invention, 3-D printing system 100 may comprise four printing heads, each one for dispensing a different color, allowing for four-color (CMYK) printing. A further printing head may also be used for dispensing transparent interface material, for example.

In an alternative embodiment, instead of using two print heads, each dispensing interface material, which may have a different modulus of elasticity and/or other different characteristics, such as different colors, a single print head can be adapted so as to dispense two or more interface materials.

Figure 7:
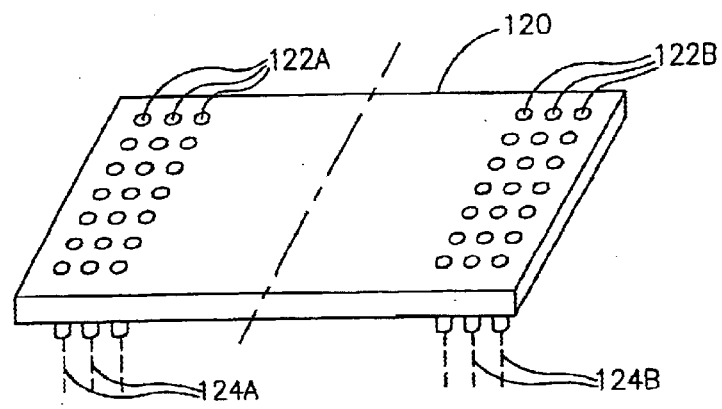
FIG. 7 is a schematic illustration of a printing head for use with the printing system of FIG. 3.

Reference is now made to FIG. 7, which is a schematic illustration of a printing head 120. Printing head 120, which is similar to the printing heads 104 (described hereinabove with respect to FIG. 3), includes a plurality of ink-jet type nozzles 122a and 122b, through which interface material 124a and 124b, respectively, is jetted. That is, the printing head 120 is divide into two groups of ink-jet nozzles. Thus, the single printing head 120 is similar to two of the printing head 104 (FIG. 3).

In operation, ink-jet nozzles 122a and 122b can be activated in accordance with pre-determined control commands to dispense either or both of interface materials 124a and 124b, as required, to selectively mix material to achieve a material of specific modulus of elasticity.

Figure 8:
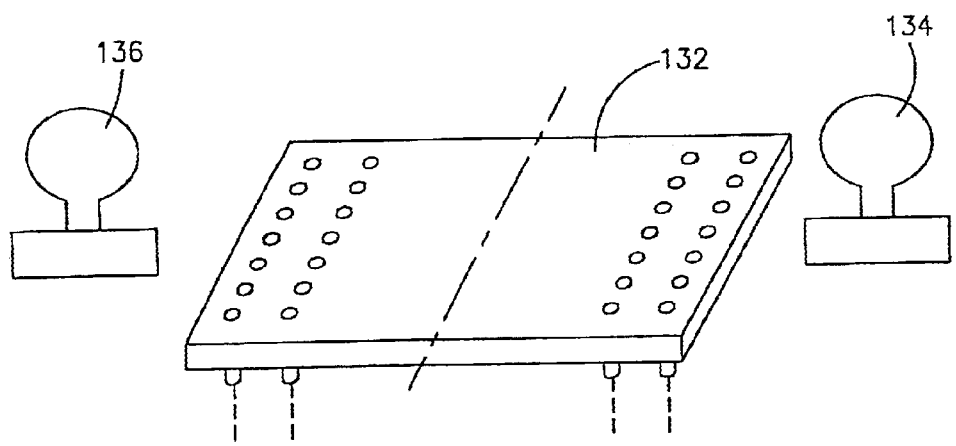
FIG. 8 is a schematic illustration of part of an alternative embodiment of part of a 3-D printing system.

In a further alternative embodiment, illustrated in FIG. 8, the hardness (modulus of elasticity) of the dispensed material can be controlled by regulating the curing time of the material being dispensed. FIG. 8 schematically illustrates a printing system 130 comprising inter alia a printing head 132 and two curing units 134 and 136.

The printing head 132 includes a plurality of ink-jet type nozzles, similar to those described hereinabove with respect to FIG. 3, for dispensing interface material. The curing units 134 and 136 are any suitable curing units utilizing UV radiation, for example, for curing. Each of the curing units 134 and 136 can be configured for emitting radiation of different wavelengths. By adjusting the radiation wavelength and/or the time for curing, the cured interface material will have a different modulus of elasticity.

Thus, in order to produce interface materials for the support, release and construction layers, having different modulus of elasticity, different radiation wavelengths are used. By using two curing units, each emitting radiation of a different wavelength, the hardness of the interface material is controllable. Thus, by selectively curing the interface material being deposited it is possible to control the softness (/hardness) of the material and hence determine the adhesiveness of the material being applied to the surface.

It will be further appreciated that the present invention is not limited by what has been described hereinabove and that numerous modifications, all of which fall within the scope of the present invention, exist. Rather the scope of the invention is defined by the claims, which follow:

What is claimed is:

1. A method for three-dimensional printing of a model, said method comprising:
   dispensing a first photopolymer and a second photopolymer from at least one printing head in variably selectable proportions, said first photopolymer and sais second photopolymer being different;
   said first photopolymer and said second photopolymer mixing within the same layer to produce a layer of third material, said third material being a photopolymer having prerequisite hardness and modulus of elasticity.

2. The method according to claim 1, wherein said at least one printing head includes first and second printing heads and wherein said first photopolymer and second photopolymer are dispensed from said first and second printing heads, respectively.

3. The method according to claim 1, wherein the first photopolymer has a first modulus of elasticity, further comprising the step of:
   curing said first photopolymer for a first period of time and at a first radiation wavelength to obtain said first modulus of elasticity.

4. The method according to claim 1, wherein the second photopolymer has a second modulus of elasticity, the method comprising the step of:
   curing said second photopolymer for a second period of time and at a second radiation wavelength to obtain said second modulus of elasticity.

5. The method according to claim 1, wherein said step of combining includes the step of:
   adjusting the relative proportions of said first and second photopolymers so that said third material has a third modulus of elasticity.

6. The method according to claim 1, wherein said third material comprises approximately 95 to 100% of said first photopolymer and 0 to 5% of said second photopolymer, wherein said third material forms a model layer for forming the model.

7. The method according to claim 1, wherein said third material is comprised of approximately 0 to 5% of said first photopolymer and approximately 95 to 100% of said second photopolymer, wherein said third material forms a support layer.

8. The method according to claim 1, wherein said first photopolymer is a different color than said second photopolymer.

9. The method according to claim 1, wherein said first photopolymer is transparent.

10. The method according to claim 1, wherein said second photopolymer is transparent.

11. The method of claim 1, wherein the first photopolymer has a first modulus of elasticity and wherein the second photopolymer has a second modulus of elasticity.

12. The method according to claim 1, wherein said third material forms a model layer, the method comprising:
   combining said first and second photopolymers to form a support layer, said support layer having a lower modulus of elasticity than said model layer.

13. The method according to claim 12 wherein said support layer includes at least a plurality of release blocks.

14. The method of claim 1, comprising repeating said dispensing and combining steps to construct multiple layers of a three-dimensional model.

15. The method of claim 1, comprising combining said first and second photopolymers to produce a support layer.

16. The method of claim 1, comprising combining said first and second photopolymer materials to produce a model layer.

17. The method of claim 1, comprising combining said first and second photopolymers to produce a release layer.

18. The method according to claim 1, comprising:
   combining said first and second photopolymers to produce a support layer; and
   combining said first and second photopolymers to produce a model layer, the support layer having a lower modulus of elasticity than the model layer.

19. The method according to claim 1, comprising:
   combining said first and second photopolymers to produce a release layer; and
   combining said first and second photopolymers to produce a model layer, the release layer having a lower modulus of elasticity than the model layer.

20. A system for three-dimensional printing of a model, the system comprising:

at least one print head;

at least first and second dispensers connected to said at least one printing head for dispensing at least first and second photopolymers respectively in variably selectable proportions, said first photopolymer and said second photopolymer being different; and a controller connected to said at least one printing head to cause said at least one printing head to dispense said first photopolymer and second photopolymer, so that said first photopolymer and second photopolymer mix within the same layer to produce a layer of third material, said third material being a photopolymer layer having prerequisite hardness and modulus of elasicity.

21. The system according to claim 20 further comprising an electromagnetic radiation source for curing at least one of said photopolymers.

22. The system according to claim 21 wherein said first photopolymer has a first modulus of elasticity and said second photopolymer has a second modulus of elasticity and said electromagnetic radiation source includes at least:

a first electromagnetic radiation source for curing said first photopolymer for a first period of time and at a first radiation wavelength to obtain said first modulus of elasticity; and a second electromagnetic radiation source for curing said second photopolymer for a second period of time and at a second radiation wavelength to obtain said second modulus of elasticity.

23. The system according to claim 20, wherein said printing head includes first and second printing heads and wherein said first photopolymer and second photopolymer are dispensed from first and second printing heads, respectively.

24. The system according to claim 20 further comprising a positioning apparatus coupled to said controller for selectively positioning said first and second printing heads by commands from said controller.

25. The system according to claim 20, wherein said first and second photopolymers are curable by the application of any one of a group including ultra-violet radiation, infra red radiation and E-beam.

26. The system according to claim 20, wherein said first photopolymer is a different color than said second photopolymer.

27. The system according to claim 20, wherein said first photopolymer is transparent.

28. The system according to claim 20, wherein said second photopolymer is transparent.

29. The system according to claim 20 wherein first and second photopolymers are combined into build layers and support layers, said build layers and support layers each including differing proportions of said first and said second photopolymers.

30. The system of claim 20, wherein said controller is operative to cause said at least one printing head to dispense said first and second photopolymers to construct multiple layers of a three-dimensional model.

31. The system of claim 20, wherein said third material forms a support layer.

32. The system of claim 20, wherein said third material forms a model layer.

33. The system of claim 20, wherein said third material forms a release layer.

34. The system of claim 20, wherein the controller is operative to cause said at least one printing head to dispense said photopolymers so that said photopolymers are combined to form a support layer; and wherein the controller is operative to cause said at least one printing head to dispense said photopolymers so that said photopolymers are combined to form a model layer, the support layer having a lower modulus of elasticity than the model layer.

35. The system of claim 20, wherein the controller is operative to cause said at least one printing head to dispense said photopolymers so that said photopolymers are combined to form a release layer; and wherein the controller is operative to cause said at least one printing head to dispense said photopolymers so that said photopolymers are combined to form a model layer, the release layer having a lower modulus of elasticity than the model layer.

36. A system for three-dimensional printing of a model, the system comprising:

at least one printing head, having a plurality of nozzles;

a plurality of dispensers connected to said at least one printing head for dispensing a plurality of different photopolymers, each photopolymer having a different color; and a controller connected to said at least one printing head for combining said plurality of photopolymers in variably selectable proportions; said plurality of photopolymers mixing within the same layer to produce a layer of third material.

37. The system according to claim 36, wherein said printing head includes a plurality of printing heads and wherein each of said plurality of photopolymers are dispensed from a different one of each of said plurality of printing heads.

38. The system according to claim 36 wherein said photopolymers have different moduluses of elasticity.

39. The system according to claim 36, further comprising a dispenser for dispensing transparent photopolymer.

40. The system according to claim 36, wherein said photopolymers are curable by the application of any one of a group including ultra-violet radiation, infra red radiation and E-beam.

41. The system of claim 36 comprising an electromagnetic radiation source for curing at least one of the photopolymers.

42. The system according to claim 37 wherein said electromagnetic radiation source includes a first electromagnetic radiation source for curing at least one of said photopolymers for a first period of time and at a first radiation wavelength to obtain a first modulus of elasticity.

43. The system of claim 36 wherein said controller is operative to cause said at least one printing head to dispense said first and second photopolymers to construct multiple layers of a three-dimensional model.

* * * * *